(12) United States Patent
Inoue et al.

(10) Patent No.: US 10,943,615 B2
(45) Date of Patent: Mar. 9, 2021

(54) DIFFERENTIAL INTERFACE TRANSMISSION OF FLY-HEIGHT CONTROL DATA

(71) Applicant: Marvell World Trade Ltd., St. Michael (BB)

(72) Inventors: Takahiro Inoue, Chigasaki (JP); Shinichiro Kuno, Hiratsuka (JP); Takao Sugawara, Isehara (JP)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

(21) Appl. No.: 16/720,818

(22) Filed: Dec. 19, 2019

(65) Prior Publication Data

US 2020/0202894 A1    Jun. 25, 2020

Related U.S. Application Data

(60) Provisional application No. 62/783,041, filed on Dec. 20, 2018.

(51) Int. Cl.
*G11B 5/54* (2006.01)
*G11B 5/60* (2006.01)
*G11B 5/596* (2006.01)

(52) U.S. Cl.
CPC .......... *G11B 5/607* (2013.01); *G11B 5/59688* (2013.01); *G11B 5/6029* (2013.01); *G11B 5/6076* (2013.01)

(58) Field of Classification Search
CPC ... G11B 20/0013; G11B 5/54; G11B 5/59633; G11B 20/1002; G11B 5/09; G11B 20/10

USPC ................................ 360/75, 67, 46, 31, 39
See application file for complete search history.

(56) References Cited

U.S. PATENT DOCUMENTS

| | | | |
|---|---|---|---|
| 5,642,244 A | 6/1997 | Okada et al. | |
| 7,057,836 B1 | 6/2006 | Kupferman | |
| 7,092,180 B2 * | 8/2006 | Franck | G11B 5/09 327/317 |
| 7,869,153 B1 | 1/2011 | Tan et al. | |
| 8,274,749 B1 | 9/2012 | Pinvidic et al. | |
| 8,665,547 B1 | 3/2014 | Yeo et al. | |
| 8,873,191 B2 | 10/2014 | Li et al. | |
| 2002/0159187 A1 | 10/2002 | Kagami et al. | |
| 2007/0236819 A1 | 10/2007 | Hashizume | |
| 2011/0157740 A1 | 6/2011 | Baumgart et al. | |
| 2013/0155538 A1 | 6/2013 | Contreras | |
| 2014/0104716 A1 | 4/2014 | Wilson et al. | |
| 2015/0318030 A1 | 11/2015 | Wilson et al. | |
| 2015/0340062 A1 | 11/2015 | Barnett et al. | |

OTHER PUBLICATIONS

European Search Report for European Application No. EP19218944 dated Apr. 17, 2020.

* cited by examiner

*Primary Examiner* — Nabil Z Hindi

(57) ABSTRACT

Methods and systems are disclosed for controlling fly-height of a read/write (RW) head. In an embodiment, a RW channel detects a servo gate signal and toggles a mode signal within a preamplifier from a RW data mode signal to a fly-height control (FHC) mode signal. In response to the FHC mode signal, the RW channel transmits FHC data over a differential interface to the preamplifier.

14 Claims, 10 Drawing Sheets

DIFFERENTIAL INTERFACE TRANSMISSION OF FLY-HEIGHT CONTROL DATA

CROSS-REFERENCE TO RELATED PATENT APPLICATION

This disclosure claims the benefit of priority of U.S. Provisional Application Ser. No. 62/783,041 filed Dec. 20, 2018, entitled, "METHOD TO TRANSMIT DATA TO PREAMP THROUGH DIFFERENTIAL INTERFACE", the contents of which is incorporated herein by reference in its entirety.

BACKGROUND

The disclosure generally relates to hard drive operations and in particular to transmitting and otherwise processing fly-height control information for read/write heads.

In disk drives, read/write (RW) heads are disposed within a slider at the distal end of a head gimbal assembly (HGA) suspension. The HGA suspension may be connected to and controlled by a voice coil actuator that includes a voice coil motor (VCM) that positions one or more heads at target locations over respective disk surfaces. The high-speed motion between the disk surface as it spins and the slider generates an upward lift force on the slider, establishing an air bearing surface (ABS) between the slider and overall head assembly and the disk surface. Typically, RW heads are located at a trailing edge of the slider that is usually closer to the disk surface than the slider leading edge.

Accurate signal transmission between the disk surface and a RW head depends in part on the magnetic field strength that is associated with the relative positioning of RW head and disk surface. The magnetic field strength varies inversely and exponentially with the distance between the magnetic transducer heads and the disk surface. The distance between a RW head and disk surface is commonly referred to as fly-height. To maintain an acceptable and consistent bit error rate (BER), disk control systems may be configured to maintain a magnetic field strength adequate for the areal data density at the disk surface. Maintaining the relation between magnetic field strength and areal density to maintain BER below a threshold may require fly-height control that is coordinated with on-disk data distribution.

In some applications, disk control systems maintain a substantially constant fly-height at a value on the order of nanometers, for example, to maintain an acceptable BER. Maintaining a constant fly-height value requires adjusting for structural factors such as disk surface irregularities as well as dynamic factors such as vibration and temperature. A single end serial interface is frequently utilized in a fly-height control (FHC) loop to transmit FHC instructions from a read/write (RW) channel to a preamplifier component that is configured to decode and implement the FHC instructions.

BRIEF DESCRIPTION OF THE DRAWINGS

Aspects of the disclosure may be better understood by referencing the accompanying drawings.

DESCRIPTION

Figure 1:
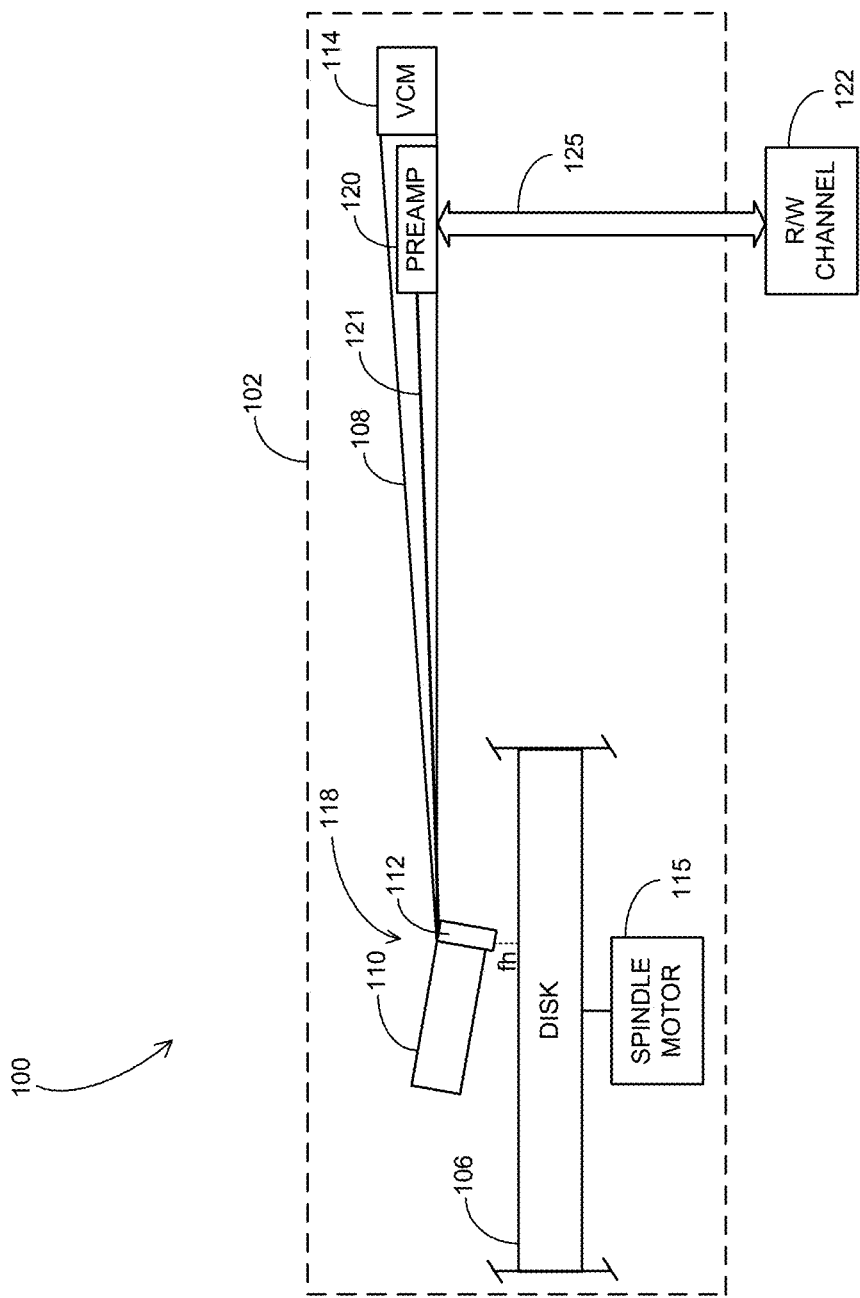
FIG. 1 is a conceptual, partial block diagram depicting a disk drive system that is configured to implement fly-height control (FHC) in accordance with some embodiments.

The description that follows includes example systems, methods, techniques, and program flows that embody aspects of the disclosure. However, it is understood that this disclosure may be practiced without some of these specific details. In some instances, well-known instruction instances, protocols, structures and techniques have not been shown in detail in order not to obfuscate the description.
Introduction Dynamic FHC during disk read/write (RW) operations is an important factor in maintaining and improving bit error rate (BER) for disk drive systems. Generally, disk drive control systems may be configured to generate FHC data based on current operating conditions to maintain an optimal spacing between a magnetic head and a disk surface. FHC for RW heads may be implemented by components that use read-back signals detect fly-height as well as components that use servo sector information. The read-back signal's amplitude and a Wallace spacing loss relationship may be utilized to verify the relative fly-height. FHC components adjust head fly-height based on these information and other information. For example, a thermal fly-height control (TFC) heater may be disposed in a slider to adjust the slider near the read and write elements via thermal expansion, which lowers the fly-height for the heads. To determine the FHC signals such as TFC heater control signals to achieve a target fly-height for a head requires periodic (synchronous or asynchronous) transmission of FHC data from a RW channel to a preamplifier device that includes the FHC circuitry.

To provide dynamic control, FHC data, which includes information and/or instructions for adjusting fly-height, may vary based on factors such as operating conditions and disk surface characteristics. An FHC loop includes components that detect and/or store information such as operational and environmental conditions that require modifying FHC data. The detection and storage components may provide the information to disk drive control components including a RW channel that is configured to transmit the FHC data to a head disk assembly (HDA) preamplifier circuit. In addition to including circuitry for processing FHC data, the preamplifier includes components configured to transmit and otherwise process bi-directional read and write data between the heads and the RW channel.

Because of its location, typically on the armature near the heads, the preamplifier has a limited spatial footprint. The transmission interfaces between the preamplifier and the RW channel typically include a single end serial interface that carries FHC data traffic and a differential interface that carries RW data traffic. The RW data received by the preamplifier such as from the heads has very low amplitude and is therefore susceptible to noise distortion. In addition to minimizing required power, a differential interface for RW data provides optimal resistance to transmission noise including common mode noise and radiation noise. A single-end serial interface used for transmitting FHC data to the preamplifier circuit may generate transmission noise that may interfere with RW data transmission thus increasing BER. Furthermore, the frequency of FHC data transmission may be higher for systems that employ servo sector-based fly-height adjustment.

Overview

Methods, systems, devices, and components are disclosed herein for implementing a shared differential interface between a RW channel (sometimes referred to as a read channel) and a preamplifier. The differential interface is configured using various combinations of transmission circuitry including logic circuits to transmit FHC data from a RW channel to a preamplifier. As utilized herein, "preamplifier" or "preamplifier device," generally refers to a hard disk drive (HDD) specific multi-function component disposed in near proximity to the magnetic heads within a hard disk assembly (HDA). The preamplifier includes and integrates other components and functions such as decoder components and FH controller components together with signal driver and amplification components. Within or in addition to the differential interface, coded logic components within the RW channel and preamplifier are configured to transmit and otherwise process the FHC data without colliding or otherwise interfering with RW data traffic between the RW channel and preamplifier.

In some embodiments, a differential interface (DI) includes one or more differential interface (DI) ports between a RW channel and a preamplifier. Each of the DI ports includes differential signaling circuitry for sending and/or receiving complementary signal pairs. During FHC cycles, FHC data is transmitted from the RW channel to the preamplifier using the differential interface, which is used to transmit RW data between the RW channel and preamplifier during RW cycles. In some embodiments, the system includes a differential interface comprising two DI ports and supporting logic to implement FHC cycles that are separated from RW data cycles by servo gate transitions. A servo gate transition is used to separate a RW data mode from an FHC mode during which an FHC cycle is executed. During an FHC cycle, the RW channel uses one DI port to transmit the FHC data and another DI port to simultaneously transmit a clock signal from the RW channel to the preamplifier. The preamplifier includes a decoder configured to decode the FHC data using the clock signal.

In some embodiments, a servo gate transition is used to separate RW cycles from an FHC cycle in which a DI port is used transmit an FHC data stream that includes a start bit. The preamplifier circuit includes components configured to detect the start bit preceding the FHC data in the FHC data stream. The preamplifier is configured to measure the interval of the start bit based on an internal preamp clock signal and to generate an FHC clock based on the measured interval. The preamplifier circuit further includes a decoder configured to decode the FHC data using the generated FHC clock signal.

In some embodiments, FHC data may be dependent on servo sector information and FHC cycles are separated from RW cycles by using RW seek intervals. During a seek operation, a RW channel transmits all sectors' FHC data for the target track to the preamplifier. The preamplifier stores the FHC data in internal registers in a manner in which the FHC data can be accessed based on the sector to which it corresponds. For each detection of a servo sector, the RW channel transmits a sector pulse to the preamplifier through a DI port. The preamplifier increments a counter to track the sector ID by incrementing the counter for each sector pulse and clearing the counter in response to receiving a full revolution servo index pulse from the RW channel. Following a seek operation, the preamplifier controls fly-height based on FHC data for a sector that corresponds to the counter value.

Example Illustrations

FIG. 1 is a conceptual, partial block diagram depicting portions of a disk drive system 100 that is configured to implement fly-height control in accordance with some embodiments. Disk drive system 100 includes a head disk assembly (HDA) 102 comprising electromechanical components that are configured to read and write magnetically stored data. HDA 102 includes one or more magnetic disks such as a disk 106 having ferromagnetic surfaces (one or both sides) and that spins under the control of a spindle motor 115. Data may be stored on disk 106 using sectors as the basic unit of storage and with a track comprising a set of sectors forming a complete circle.

HDA 102 further includes one or more RW head assemblies such as a head assembly 118 (sometimes referred to as a head gimbal assembly) that comprises a slider 110 and one or more read and write (RW) heads 112 attached to the distal end of an actuator arm 108. A single head assembly 118 is depicted for purposes of illustrative clarity and typically multiple such head assemblies are configured as a head stack assembly at the end of one or more actuator arms. In such a configuration, the RW heads are disposed within the HSA in an interleaved manner between multiple disk platters.

To implement read and write operations, head assembly 118 is movable by electromechanical actuator comprising an actuator arm 108 and a voice coil motor (VCM) 114. During read/write seek intervals, VCM 114 rotates actuator arm 108 to position head assembly 118 at a specified radial location over the surface of disk 106 to access a specified track to be written to or read from via magnetic field interactions with RW heads 112. Depicted as a single block in FIG. 1, RW heads 112 represent a combination of at least one read head and at least one write head disposed at or near the trailing edge of slider 110.

A read head component with RW head 112 may comprise a magnetoresistive (MR) or giant magnetoresistive material (GMR). For example, a GMR read element may be a stripe of relatively soft magnetic material having a resistance value that varies with the polarity of an applied magnetic field. Additionally or alternatively, one or more read heads may comprise an inductive element in which a current is induced into the element by an applied magnetic field. A write head component within RW head 112 may comprise an inductive element having a gap oriented toward the bottom of slider 110 to direct a generated magnetic field to the surface of disk 106.

HDA 102 further includes a preamplifier 120 disposed between RW heads 112 and a RW channel 122 that forms part of an overall disk control system that is depicted in further detail in FIG. 2. Preamplifier 120 is communicatively coupled with head assembly 118 via a signal path 121 to enable two-way transmission of signals, including low-amplitude analog signals between head assembly 118 and preamplifier 120. For example, data and instruction signals may be transmitted by preamplifier 120 to components within head assembly 118 and readback signals may be transmitted from components in head assembly 118 to preamplifier 120. Preamplifier 120 includes amplification and other functional components configured to transmit a relatively noisy signal from head assembly 118 with minimal noise and other distortion. To this end, preamplifier 120 is configured to amplify read signals from head assembly 118 and drive the amplified signals to RW channel 122. Preamplifier 120 is also configured to drive write signals received over differential interface 125 from RW channel 122 to head assembly 118.

Preamplifier 120 is communicatively coupled with RW channel 122 via a shared differential interface 125 that includes differential signaling components within each of preamplifier 120 and RW channel 122. Differential interface 125 may comprise differential signal drivers such as positive emitter-coupled logic (PECL) or low-voltage PECL drivers. Whether configured to includes PECL drivers or other types of differential signaling circuitry, differential interface 125 is configured to transmit information using one or more pairs of signal lines carrying complementary pair signals. With balanced impedance matching between source and receiver, external radiation noise affects both complementary signals substantially equally. Differential interface 125 is more resistant to radiation noise than single-ended interfaces (one signal line and a reference line) since the receiver detects the difference between the signal complementary signal lines.

In some embodiments, differential interface 125 is used both for transmitting RW data and FHC data between RW channel and preamplifier 120. To maintain a minimized spatial footprint for preamplifier 120, differential interface 125 is a shared interface including components within and between preamplifier 120 and RW channel 122 configured to coordinate FHC signaling and RW data signaling cycles.

Fly-height control for head assembly 118 is determined by FHC signals transmitted from RW channel 122 to preamplifier 120. In addition to signal amplification components, preamplifier 120 includes FHC circuitry configured to decode FHC data from RW channel 112 and transmit corresponding FHC signals to head assembly 118. For example, disk drive system 100 may employ thermal fly-height control (TFC) in which a heater element is included in head assembly 118. The heat element may be a resistor such as a carbon body resistor or other resistance heat element located proximate to RW head 112. The fly-height of RW head may be controlled by controlling the current through the heat element.

Fly-height is directly determined by the aerodynamic action of head assembly 118 as it hovers on an air-bearing between head assembly 118 and the surface of disk 106. The slider 110 within head assembly 118 may comprise an insulating material body configured in shape and size in an aerodynamic wing-like manner that carries RW heads 112 at a distance above the surface of disk 106. The distance, referred to as fly-height, is determined by the thickness of the air-bearing formed between RW heads 112 and disk 106. Typical fly-height for head assembly 118 may be in the range of nanometers.

The performance of the read and write operations, such as in terms of BER, may be significantly affected by several factors including the areal data density at a particular disk location and the magnetic field strength between RW head 118 and disk 116, which varies inversely with the fly-height. Other performance factors may include signal interference such as interference with the low amplitude signals within preamplifier 120 that may distort low-amplitude RW data signals.

Disk drive system 100 includes components such as within HDA 102 and RW channel 122 to implement differential interface 125 in a manner that improves BER performance. Differential interface 125 may be included in an FHC interface that is depicted and described in further detail with reference to FIGS. 2-6. The FHC interface may be configured to transmit the FHC data over differential interface 125 based on a servo gate signal (servo gate) that switches RW channel 122 and preamplifier 120 between a RW data mode and a servo read mode/FHC mode in which a FHC cycle is executed. Two differential interface (DI) ports are used for the FHC data transmission, one for transmitting the FHC data and one for transmitting a synchronization clock that is used by decode logic in preamplifier 120 to decode the FHC data.

In some embodiments, an FHC interface uses a single DI port within differential interface 125 to transmit FHC data with a servo gate used to switch between RW data modes and FHC modes during which FHC cycles are executed. During an FHC cycle, a start bit leads the FHC data over the single DI port and its interval measured to generate an FHC clock signal within preamplifier 120 to be used by preamp decode logic to decode the FHC data. In some embodiments, FHC data for sectors within a target track may be transmitted over differential interface 125 or another interface during a seek interval of a RW operation. The FHC data may be recorded within the preamplifier and internally accessed during a RW operation by using a DI port to track a servo sector number and access corresponding FHC data to provide sector-specific FHC.

Figure 2A:
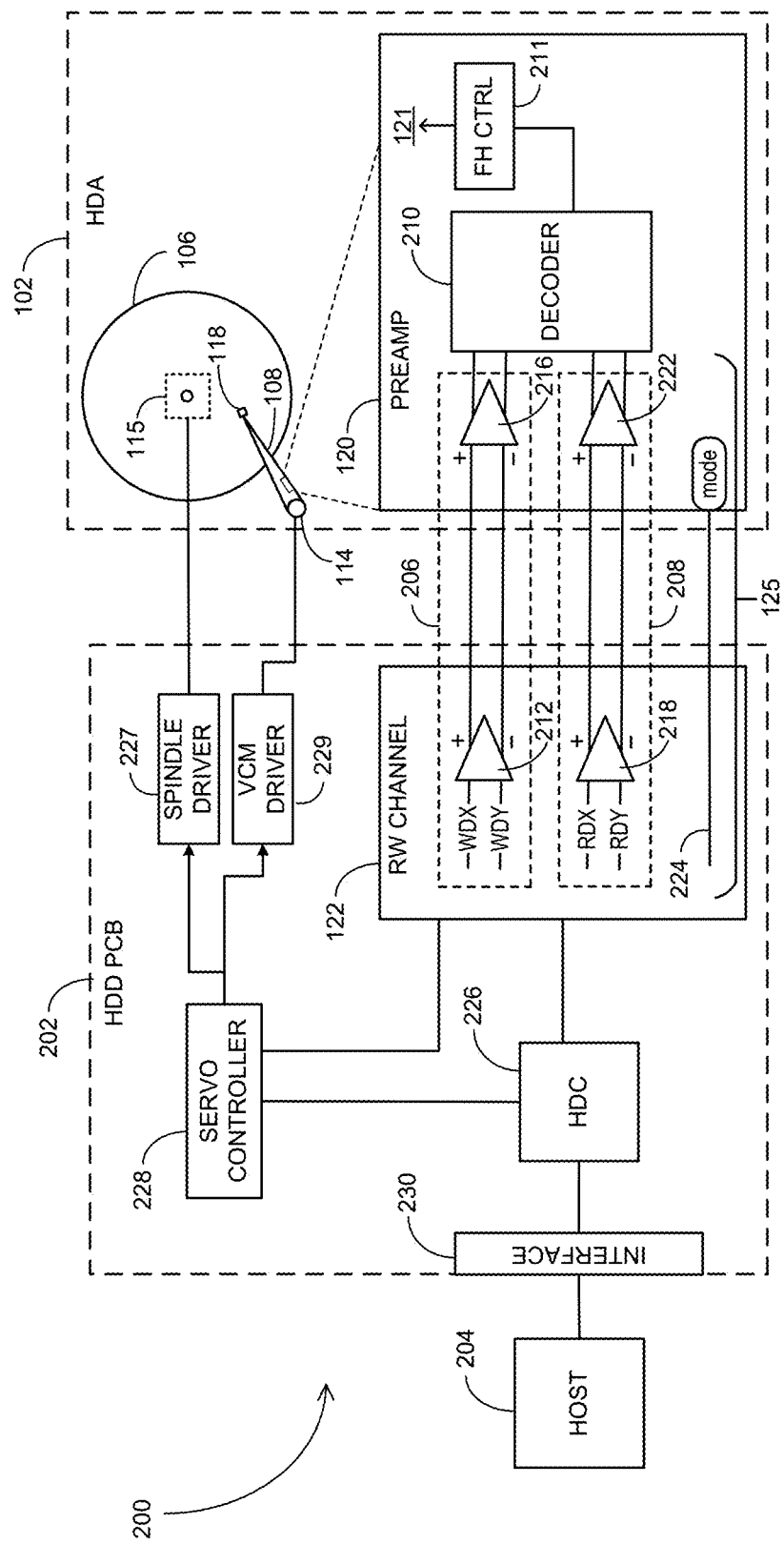
FIG. 2A is a block diagram illustrating a disk drive system that includes some of the components of the system of FIG. 1 including an FHC interface between a RW channel and a preamplifier in accordance with some embodiments.

FIG. 2A is a block diagram illustrating a hard disk drive (HDD) system 200 that includes some of the components of the system shown in FIG. 1 including a differential signaling FHC interface between a RW channel and a preamplifier in accordance with some embodiments. HDD system 200 includes an HDD printed circuit board (PCB) 202 that is coupled to a host system 204 and HDA 102. HDD PCB 202 includes electronics and logic components configured to read from and write to sectors of disk 106. HDA 102 includes disk 106 and a read/write device represented as head assembly 118 disposed at the distal end of actuator arm 108. Additionally, HDA 102 includes spindle motor 115 that rotates disk 106 and VCM 114 that actuates actuator arm 108.

A hard disk controller (HDC) 226 provides central control of HDA operation. For example, HDC 226 generates instructions that are implemented by a servo controller 228 to control the speed of spindle motor 115 via a spindle driver 227 and movement of VCM 114 via a VCM driver 229. In addition to and as part of controlling components of HDA 102, HDC 226 is configured to communicate with an external data processing system, such as the host system 204 via an I/O interface 230. I/O interface 230 may be communicatively coupled with an I/O adaptor (not depicted) of host system 204. Host system 204 may include a computer, a multimedia device, a mobile computing device, etc.

HDC 226 is further configured to provide control inputs to RW channel 122 to implement data read/write operations. RW channel 122 may be implemented as a component of a System-on-Chip (SoC) installed on HDD PCB 202 and is configured to process data received from and transmitted to preamplifier 120 within HDA 102. Preamplifier 120 amplifies signals generated by head assembly 118 during read operations and provides write data signals to head assembly 118 during write operations. Preamplifier 120 further includes a fly-height (FH) controller 211 that is configured to generate control signals for controlling fly-height of the RW heads within head assembly 118 based on FHC data. While not expressly depicted in FIG. 2A, preamplifier 120 typically includes other components such as RW registers and processing elements including digital and analog signal processors. The additional components, not depicted to maintain illustrative clarity, are configured to implement preamplifier functions such as reading/writing data from/to head assembly 118 and communicating servo control signals to head assembly 118.

FH controller 211 generates the control signals based on FHC data including instructions received from a decoder 210. Decoder 210 is programmed or otherwise configured to decode digital signals received from differential signaling components within differential interface 125. In FIG. 2A, differential interface 125 is depicted as including differential signaling components in RW channel 122, preamplifier 120, and signal lines between the corresponding differential output and input ports. The differential signaling components include a DI port 206 and a DI port 208, with DI port 206 and DI port 208 forming part of differential interface 125. DI port 206 includes a differential driver 212 within RW channel 122 and a differential driver 216 within preamplifier 120. DI port 208 includes a differential driver 218 within RW channel 122 and a differential driver 222 within preamplifier 120. Differential drivers 212, 216, 218, and 222 may comprise PECL drivers configured to receive complementary signal pair inputs and drive complementary signal pair outputs.

DI port 206 is a write port, receiving complementary write input pair WDX and WDY during data write operations. DI port 208 is a read port, driving complementary read output pair RDX and RDY during data read operations. During FHC cycles, DI ports 206 and 208 are each configured to transmit FHC data and other signals for decoding or otherwise processing the FHC data from RW channel 122 to preamplifier 120. Differential interface 125 is included in an FHC interface that may include other components such as decoder 210 and FH controller 211 that together perform FHC data transmission and implementation of FHC for head assembly 118. Differential interface 125 further includes a mode pin input 224 comprising a control input from RW channel 122 to preamplifier 120. Togging the mode input 124 switches the operating mode of preamplifier 120 between FHC mode and RW data mode.

The FHC interface further includes components and mode signal inputs for selectively activating other FHC components such as differential interface 125 to form a shared interface for FHC cycles as well as RW data operations. Operation mode control signals such as servo gate signals received by RW channel 122 from HDC may be utilized to transmit FHC data and support signals during windows that do not affect RW data operations.

A RW operation includes a servo phase during which servo data is transmitted for the RW operation and a read or write data transfer phase. Initially, HDC 226 toggles a servo gate signal input to preamplifier 120 to initiate servo mode. In response to detecting the toggled servo gate signal, RW channel 122 toggles a mode signal on preamplifier mode pin 224 to activate an FHC cycle to be performed during servo mode. During the FHC cycle, FHC data 312 is transmitted over DI port 206 and simultaneously a clock signal 316 is transmitted over DI port 208. Decoder 210 decodes the FHC data 312 using clock signal 316. The decoded data is implemented as instructions by FH controller 211 to adjust the fly-heights of the RW heads within head assembly 118. The servo mode/FHC cycle phase is terminated by toggling of servo gate 310 to begin RW data transfer. RW channel 122 responds by toggling signal 320 to switch preamplifier operation to data mode during with RW data 306 is transferred.

Figure 2B:
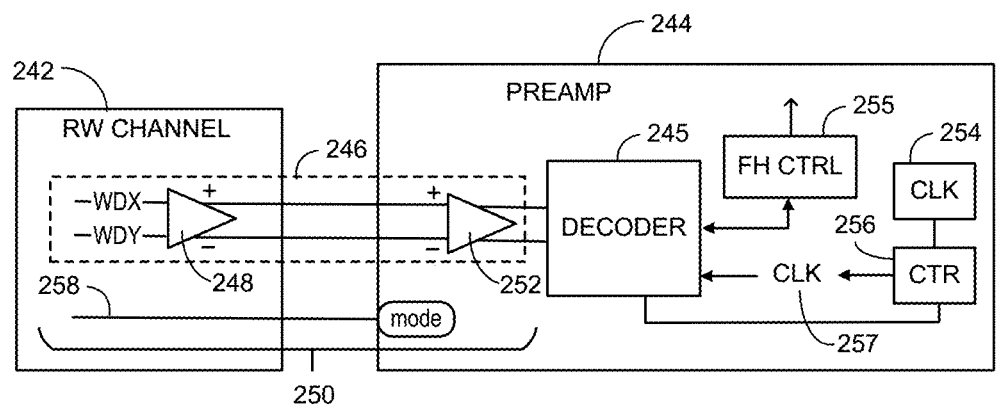
FIG. 2B is a block diagram depicting an FHC interface between a RW channel and a preamplifier in accordance with some embodiments.
Figure 2C:
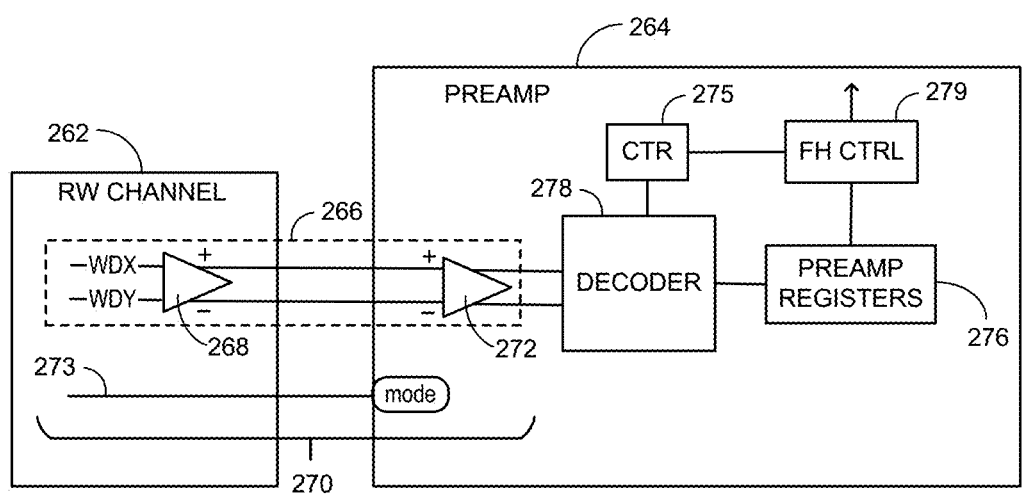
FIG. 2C is a block diagram depicting an FHC interface between a RW channel and a preamplifier in accordance with some embodiments.

The configuration and operation of an FHC interface shown and described with reference to FIG. 2A may be utilized when at least two DI ports are available for transferring data during an FHC cycle. FIGS. 2B and 2C depict FHC interfaces that utilize a single DI port during FHC cycles. FIG. 2B is a block diagram depicting an FHC interface between a RW channel 242 and a preamplifier 244 in accordance with some embodiments. The FHC interface includes a differential interface 250 comprising a DI port 246 and a mode pin input 258. DI port 246 includes a differential driver 248 within RW channel 242 and a differential driver 252 within preamplifier 244. In the depicted embodiment, DI port 246 is a write port, receiving complementary write input pair WDX and WDY during data write operations.

The FHC interface is configured to utilize servo gates to switch between a data mode during with RW data is transmitted and an FHC mode during which FHC data is transmitted during an FHC cycle. The FHC interface is further configured to encode clock information in a start bit that is transmitted in the FHC data stream to avoid the need to transmit a fully synchronous clock signal with the FHC data. In response to a servo gate signal, RW channel 242 toggles a mode signal on a mode pin 258 to activate FHC cycle mode. During FHC cycle mode, FHC data is transmitted over DI port 246. A start bit is included in the FHC data stream leading the FHC data and having a specified interval.

Preamplifier 244 includes a decoder 245 that in addition to decoding FHC data is configured to detect and decode data rate information from the start bit. In response to detecting the start bit, decoder accesses a counter 256 and an internal clock 254 to determine a determine a data rate based on the interval of the start bit as measured by counter 256 and clock 254. Counter 256 and clock 254 may be configured as a clock generator to generate a clock signal 257 having a period that is set based on the data rate. Clock signal 257 is received and utilized by decoder 245 to decode the FHC data. The decoded data is implemented as instructions by FH controller 255 to adjust the fly-height of the RW heads within a head assembly. The servo mode/FHC cycle mode phase is terminated by toggling of the servo gate within RW channel 242 to begin RW data transfer. RW channel 242 responds by toggling the mode pin input 258 to switch preamplifier operation to data mode during with RW data is transferred.

FIG. 2C is a block diagram depicting an FHC interface between a RW channel 262 and a preamplifier 264 in accordance with some embodiments. The FHC interface includes a differential interface 270 comprising a DI port 266 and a mode pin input 273. DI port 266 includes a differential driver 268 within RW channel 262 and a differential driver 272 within preamplifier 264. In the depicted embodiment, DI port 266 is a write port, receiving complementary write input pair WDX and WDY during data write operations.

The FHC interface is configured to utilize transitions between data seek intervals and data transfer intervals to switch between an FHC cycle and a data mode. The beginning of a seek interval may be communicated to RW channel 262 such as by detecting a data access (read/write) or a drive select such as from an HDC. In response to detecting a seek interval, RW channel 262 transmits FHC data for sectors with the target track to preamplifier 264. During the seek interval, the per-sector FHC data may be transmitted over DI port 266 or another DI port. The FHC data is decoded by a decoder 278 and stored in association with the respective sectors within a set of preamp registers 276. In some embodiments, the FHC data may be stored in association with respective sectors by storing each per-sector FHC data within preamp registers 276 in a sequence beginning with an initial sector and concluding with a final sector in a linked list.

With the per-sector FHC data for a track stored locally within preamplifier 264, a FH controller 279 may implement FHC by retrieving the per-sector FHC data during an FHC cycle that commences with the completion of the seek interval and transitions to a data transfer interval. During the data transfer interval, an FHC cycle entails tracking the per-sector positioning of a RW head along a track based on servo index pulses and intermediary sector pulses. In some embodiments, a counter 275 tracks a next-to-be accessed sector ID by counting the number of sector pulses transmitted over DI port 266 to preamplier 264 from RW channel 262. FH controller 279 may determine a next upcoming sector based on a current count within counter 275 and use the count sector identifier to access and utilize the FHC data corresponding to the sector from preamp registers 276. The count within counter 275 is reset every full disk revolution by an index pulse signal received by preamplier on mode pin input 273. In the foregoing manner, the FHC data is implemented as instructions by FH controller 279 to adjust the fly-height of the RW heads on a per-sector basis without having to transmit FHC data to preamplier 264.

Figure 3:
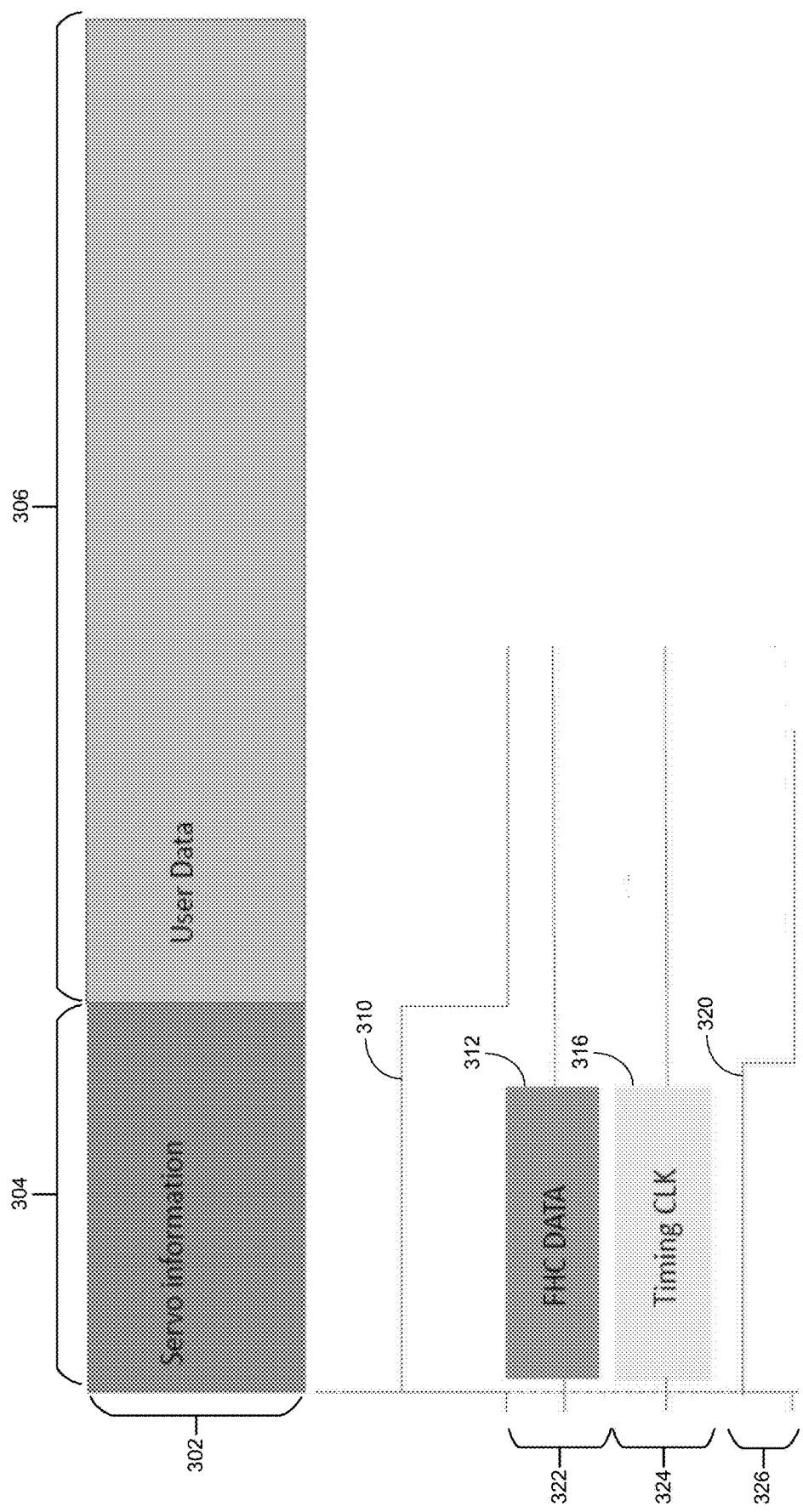
FIG. 3 is a signal timing diagram illustrating respective FHC data transmission and RW data transmission across a differential interface in accordance with some embodiments.

FIG. 3 is a signal timing diagram illustrating respective FHC data transmission and RW data transmission across a differential interface comprising two DI ports in accordance with some embodiments. The timing diagram shows data transfer over a DI port 302 that includes servo information 304 followed by user data 306 over a RW operation. An HDC-generated servo gate signal 310 is toggled to switch between servo data mode in which servo data is transmitted for a RW operation and the read or write phase of the RW operation. Initially, servo gate 310 is toggled to activate servo mode, and in response, a mode signal 320 is toggled on a preamplifier mode pin 326 to activate an FHC cycle mode. Mode signal 320 is a mode pin input signal that switches the operation mode of a preamplifer between RW mode and FHC cycle mode. During an FHC cycle, FHC data 312 is transmitted over DI port 322 and simultaneously a clock signal 316 is transmitted over a DI port 324. FHC data 312 includes information and/or instructions for controlling fly-height of a RW head and clock signal 316 is a clock signal utilized for decoding FHC data 312. The servo mode/FHC cycle phase is terminated by toggling of servo gate 310 to begin transfer of user data 306, and in response mode signal 320 is toggled to switch preamplifier operation to RW mode during with user data 306 is transferred.

Figure 4A:
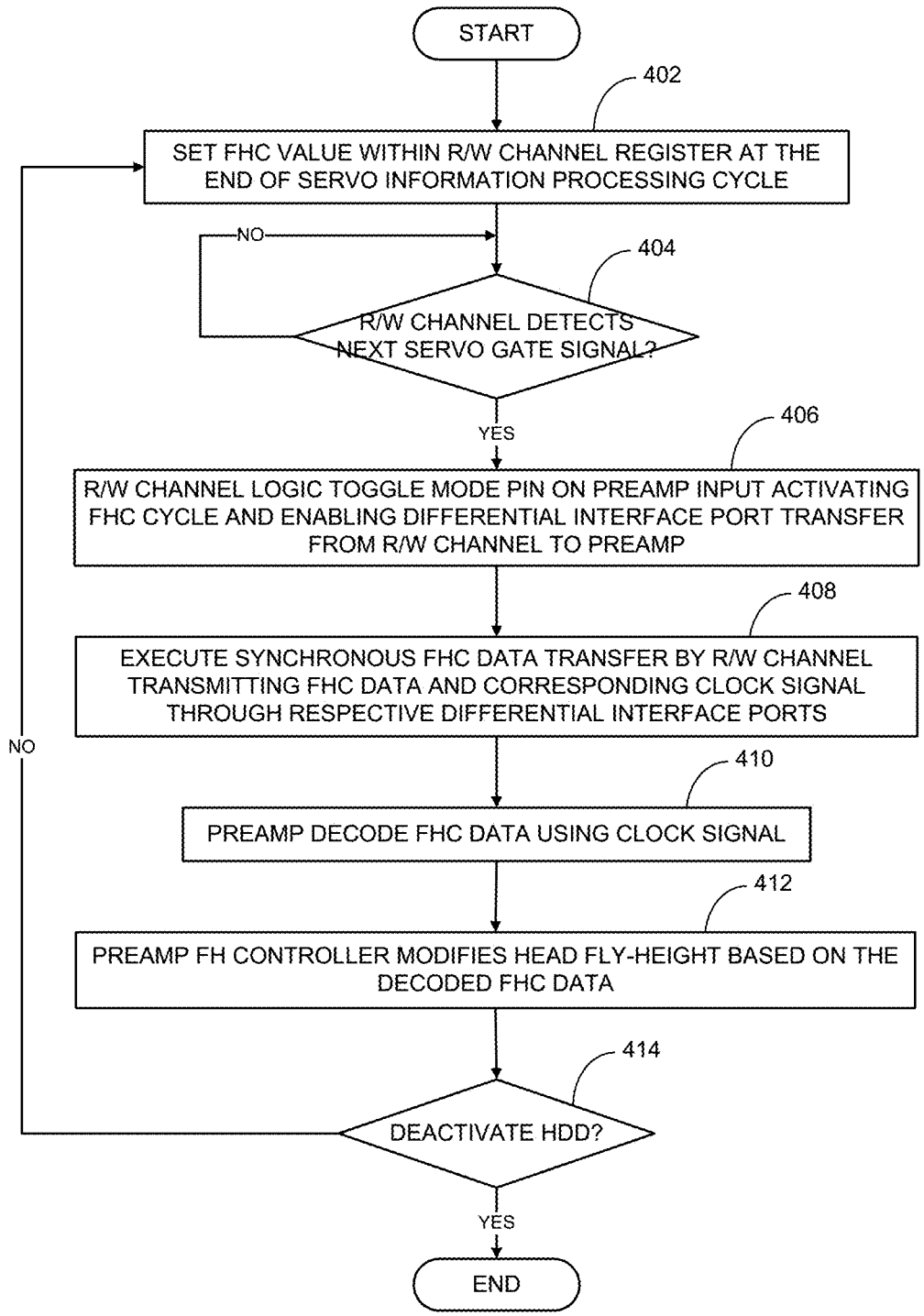
FIG. 4A is a flow diagram depicting operations and functions for controlling fly-height of a RW head including using a shared differential interface to transmit FHC data from a RW channel to a preamplifier in accordance with some embodiments.
Figure 4B:
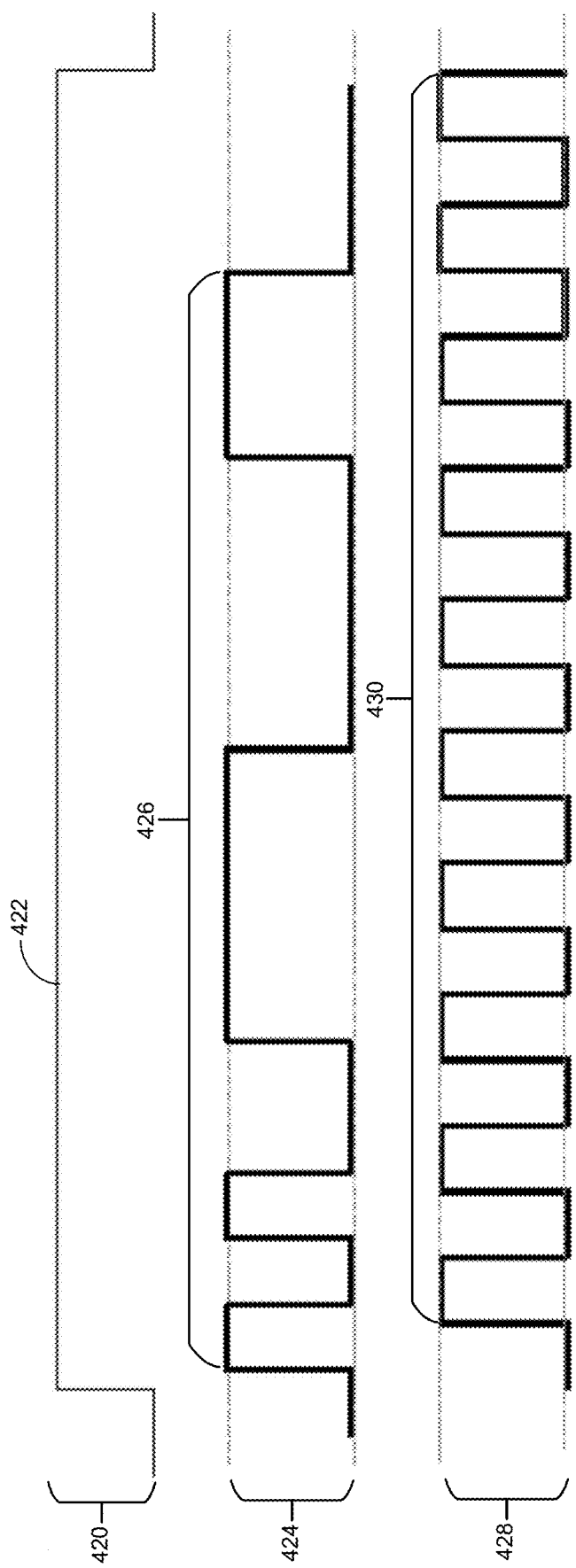
FIG. 4B is a signal timing diagram illustrating an FHC data transmission cycle in accordance with some embodiments.

FIG. 4A is a flow diagram depicting operations and functions for controlling fly-height of a RW head including transmitting FHC data synchronously with a timing clock signal over respective DI ports. FIG. 4B is a signal timing diagram illustrating an FHC data transmission cycle implemented by the process shown in FIG. 4A. The operations and function depicted and described with reference to FIGS. 4A and 4B may be implemented by RW channel components and preamplifier components such as those depicted and described with reference to FIGS. 2A and 3. The process begins at block 402 with a RW channel setting one or more FHC values within RW channel registers at the end of a servo information processing interval including a servo calculation of position error. The RW channel monitors a servo gate input (block 404) and in response to detecting a next servo gate signal, the RW channel toggles a mode signal input via a mode pin within a preamplifier (block 406). An example toggled mode signal 422 applied to a mode input pin 420 is shown in FIG. 4B. The toggled mode signal indicates and activates an FHC cycle by enabling DI port transmission from the RW channel to the preamplifier.

At block 408, the RW channel executes a simultaneous transmission of FHC data through one DI port and a synchronous clock signal through another DI port. FIG. 4B depicts an example FHC data signal 426 transmitted through a DI port 424 simultaneously with transmission of a clock signal 430 through a DI port 428 over the mode signal interval. At block 410, the preamplifier uses the transmitted clock signal to decode the FHC data. A FH controller may be co-located on a same integrated circuit component or otherwise communicatively coupled with the preamplifier. At block 412, the fly-height controller implements the decoded FHC data such as by varying a current level to a heat-element within a head assembly that uses thermal fly-height control. Control returns to block 402 until the disk drive system is deactivated at block 414.

Figure 5A:
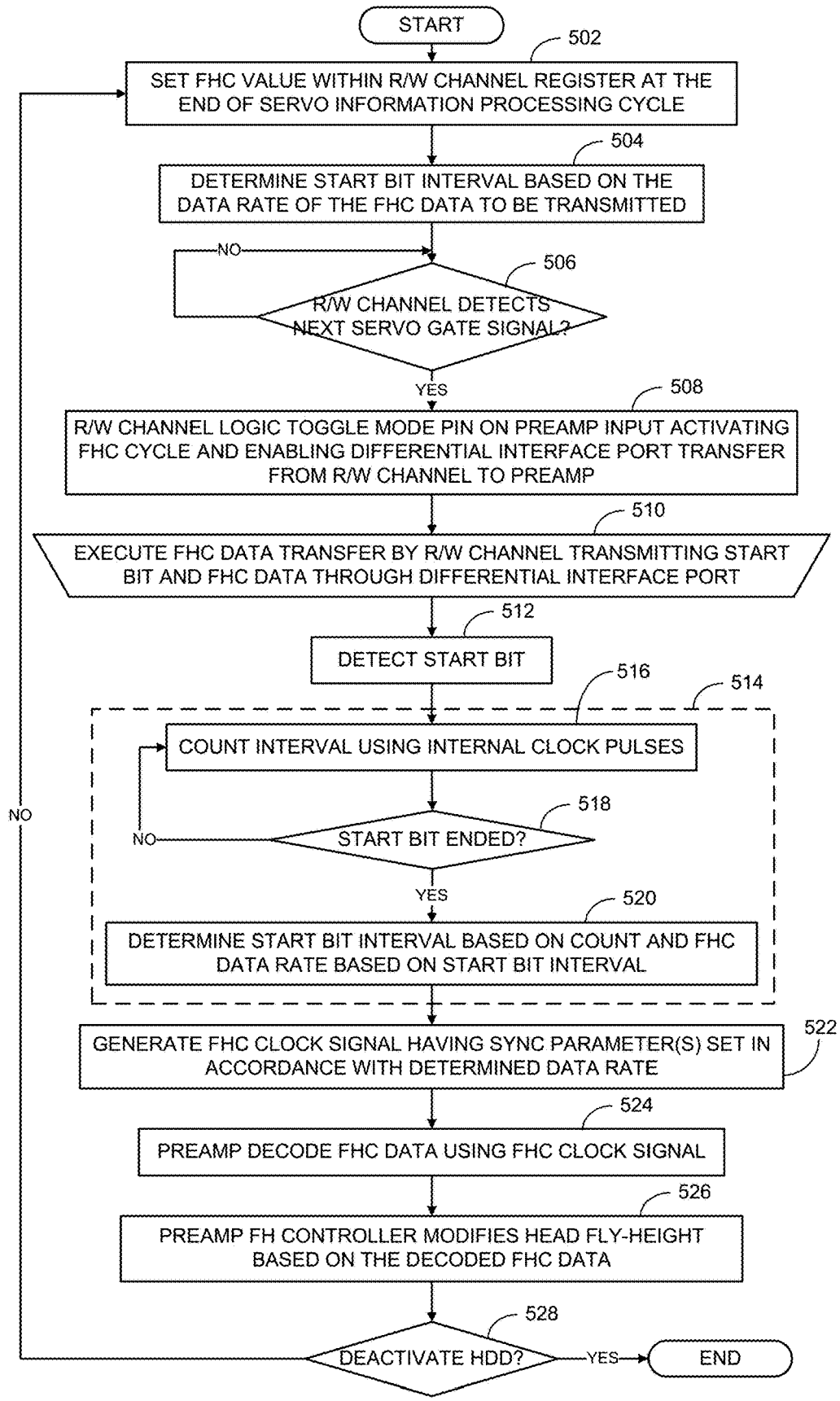
FIG. 5A is a flow diagram depicting operations and functions for controlling fly-height of a RW head including using a shared differential interface to transmit FHC data from a RW channel to a preamplifier in accordance with some embodiments.
Figure 5B:
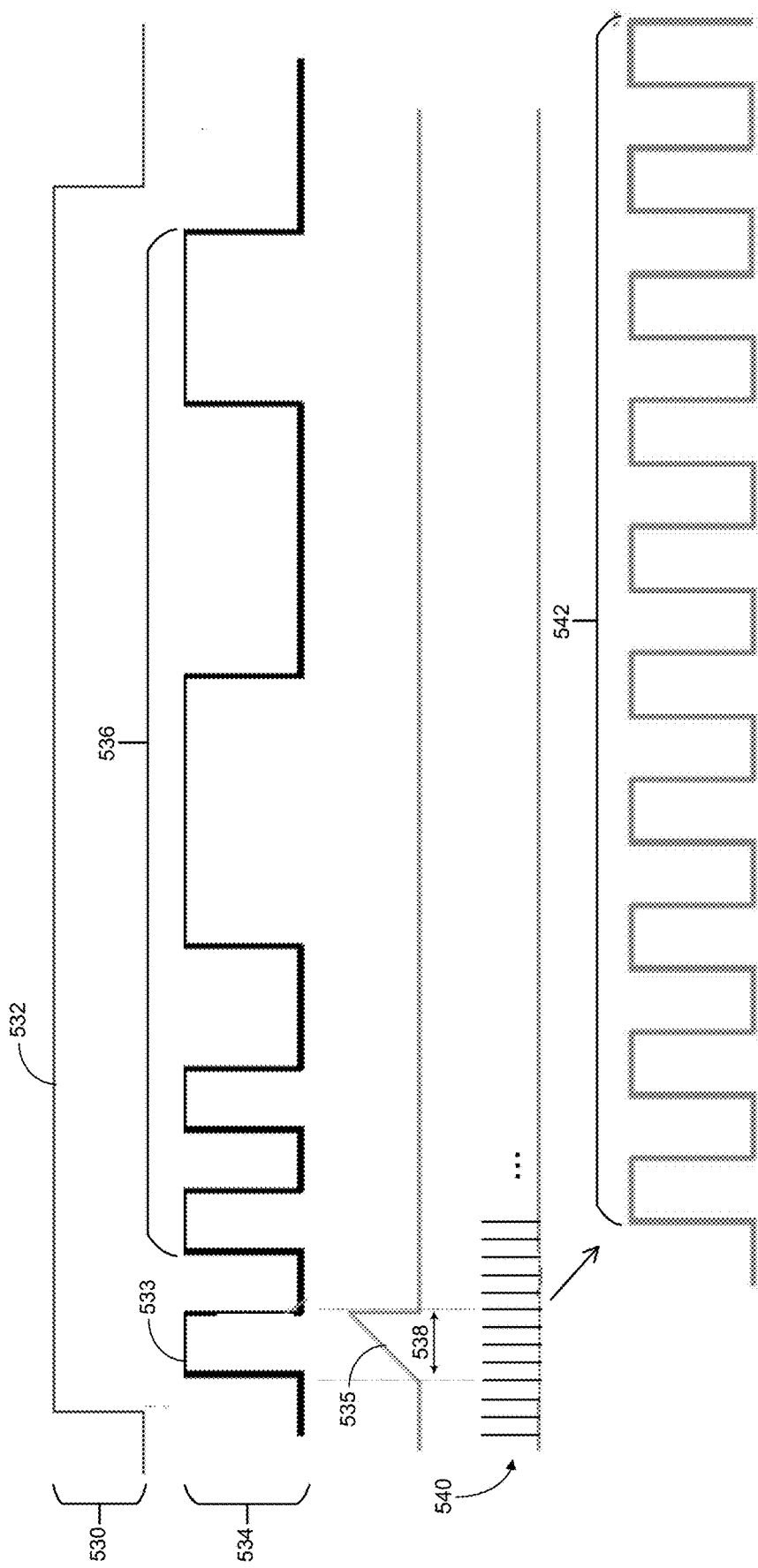
FIG. 5B is a signal timing diagram illustrating an FHC data transmission cycle in accordance with some embodiments.

FIG. 5A is a flow diagram depicting operations and functions for controlling fly-height of a RW head including using a shared differential interface to transmit FHC data from a RW channel to a preamplifier in accordance with some embodiments. FIG. 5B is a signal timing diagram illustrating an FHC data transmission cycle implemented by the process shown in FIG. 5A. The operations and function depicted and described with reference to FIGS. 5A and 5B may be implemented by RW channel components and preamplifier components such as those depicted and described with reference to FIGS. 2A and 2B.

The process begins at block 502 with a RW channel setting one or more FHC values within RW channel registers at the end of a servo information processing interval including a servo calculation of position error. At block 504, the RW channel determines an interval for a start bit that will be included in an FHC data transmission. In some embodiments, the start bit interval is determined based on the data rate of the FHC data. The RW channel monitors a servo gate input (block 506) and in response to detect a next servo gate signal, the RW channel toggles a mode signal input via a mode pin within a preamplifier (block 508). An example toggled mode signal 532 applied to a mode input pin 530 is shown in FIG. 5B. The toggled mode signal indicates and activates an FHC cycle by enabling DI port transmission from the RW channel to the preamplifier.

The process continues at block 510 with the RW channel transmitting the start bit and FHC data through a DI port. FIG. 5B depicts an example FHC data transmission sequence including a leading start bit 533 and an FHC data signal 536 transmitted through a DI port 534 over the mode signal interval. In response to detecting the start bit (block 512), the preamplifier executes a start bit processing cycle at superblock 514 in which internal clock and counter components are utilized to decode FHC data rate information from the start bit. At block 516, a counter within the preamplifier is activated upon the detection of the start bit and executes a count sequence with each count increment corresponding to an internal clock pulse. FIG. 5B depicts a counter value 535 that is incremented over a start bit interval 538 based on internal clock pulses 540. The start bit processing cycle ends at block 518 with the preamplifier detecting the end of the start bit interval, terminating the count. At block 520, preamplifier logic determining a start bit interval based on the count and determining the FHC data rate based on the start bit interval.

Following start bit processing, the preamplifier generates an FHC clock signal having synchronization parameters such as frequency and phase determined based on the determined data rate (block 522). At block 524, the preamplifier decoding logic decodes the FHC data using the generated FHC clock signal. FIG. 5B depicts an example toggled mode signal 532 applied to a mode input pin 530. The toggled mode signal indicates and activates an FHC cycle by enabling DI port transmission from the RW channel to the preamplifier. FIG. 5B further depicts the generated FHC clock signal 542 having frequency coinciding with and phase aligned with the FHC data 536. At block 526, a fly-height controller implements the decoded FHC data such as by varying a current level to a heat-element within a head assembly that uses thermal fly-height control. Control returns to block 502 until the disk drive system is deactivated at block 528.

Figure 6A:
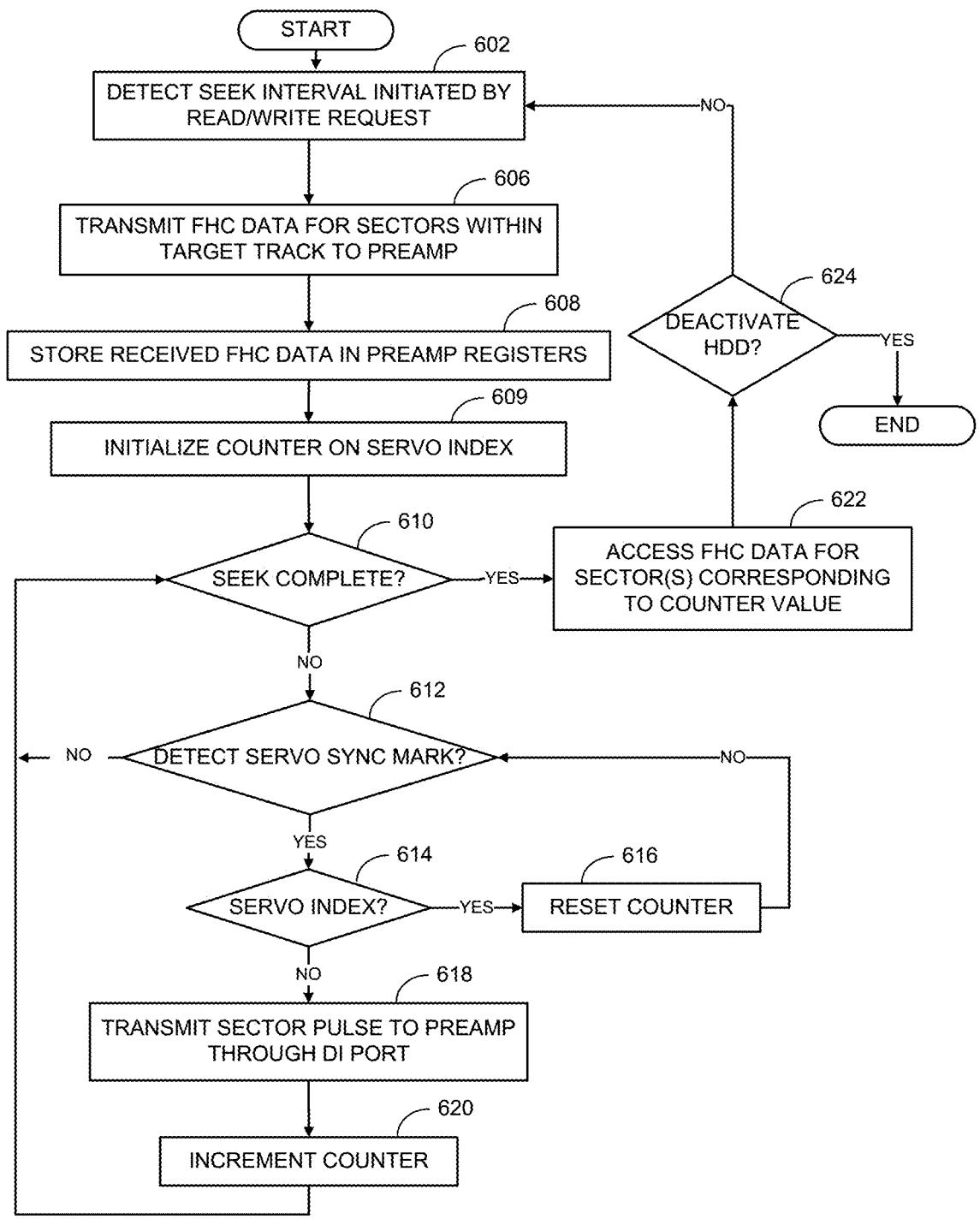
FIG. 6A is a flow diagram depicting operations and functions for controlling fly-height of a RW head including using a shared differential interface to transmit sector data from a RW channel to a preamplifier in accordance with some embodiments.
Figure 6B:
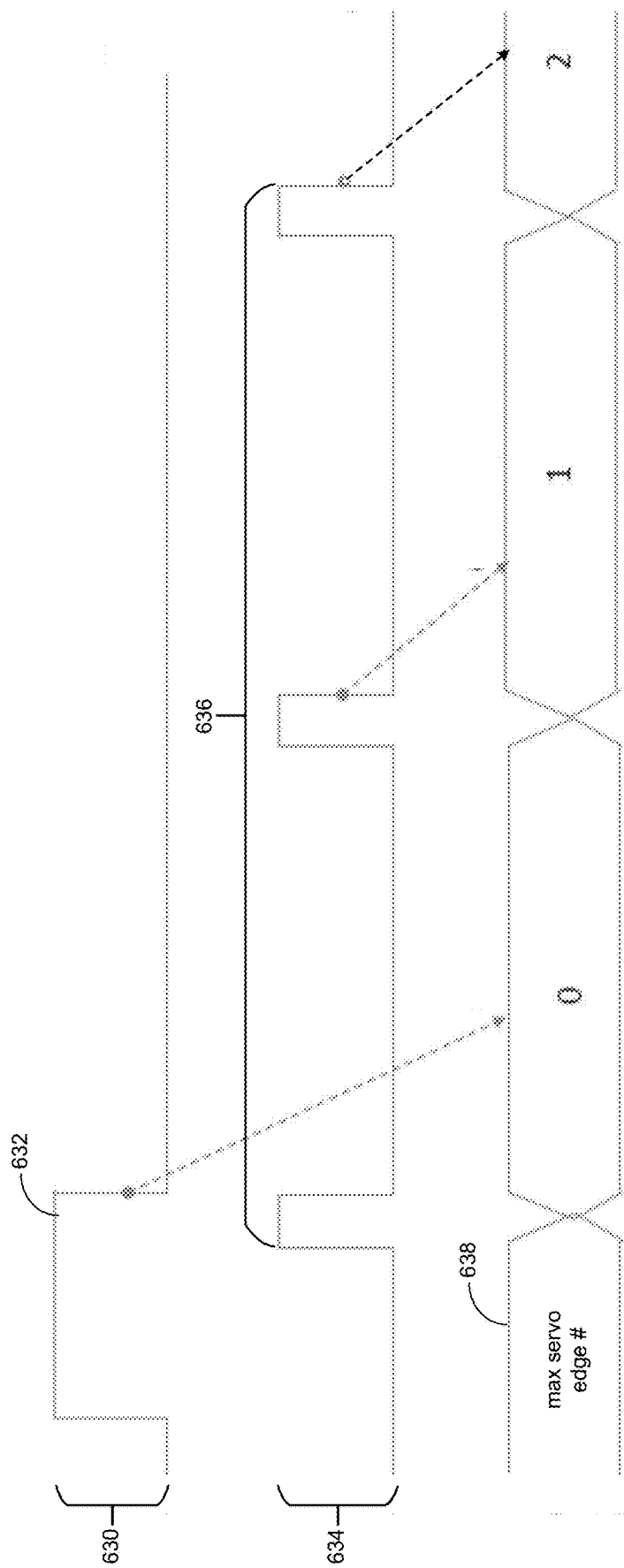
FIG. 6B is a signal timing diagram illustrating a sector data transmission cycle using a differential interface that follows FHC data transmission in accordance with some embodiments.

FIG. 6A is a flow diagram depicting operations and functions for controlling fly-height of a RW head including using a shared differential interface to transmit sector tracking data from a RW channel to a preamplifier in accordance with some embodiments. FIG. 6B is a signal timing diagram illustrating a sector data transmission cycle using a differential interface that follows FHC data transmission as implemented by the process shown in FIG. 6A. The operations and function depicted and described with reference to FIGS. 6A and 6B may be implemented by RW channel components and preamplifier components such as those depicted and described with reference to FIGS. 2A and 2C.

The process begins as shown at block 602 with disk drive system components including a RW channel detecting a RW access operation that signals the beginning of a seek interval. For example, the RW channel may detect a read or write request issued by an HDC. During at least a portion of the seek interval, the RW channel transmits the FHC data for one or more, and in some cases all, of the sectors within the track targeted by the data access request to a preamplifier (block 606). The FHC data may include sector ID information enabling subsets of the overall FHC data to be associated with respective sectors within the target track. In some embodiments, the FHC data is transmitted to the preamplifier through one or more DI ports or may be transmitted over another type of data transmission interface.

At block 608, the preamplifier stores the per-sector FHC data in preamplifier registers. The preamplifier logic resets an internal counter in response to the RW channel detecting that the read head as reached a servo index that indicates the beginning of the sector count for the target track (block 609) corresponding to one full disk revolution. In response to the servo index, the RW channel transmits a corresponding index pulse to the preamplifier via a mode pin input. FIG. 6B depicts an example index pulse signal 632 applied to a mode input pin 630 of the preamplifier and shows the correlation between index pulse signal 632 and a resetting of an internal counter signal 638 from a maximum count to an initial value.

As the seek interval continues with control passing from block 610 to block 612, the RW channel detects a next servo mark. If the mark is the servo index (block 614), the RW channel sends a corresponding signal via the mode pin input to the preamplifier and the preamplifier resets the counter (block 616). Otherwise, if the sync mark is a non-index sector sync mark indicating a next sector, the RW channel transmits a sector pulse to the preamplifier through the DI port (block 618) and the preamplifier responds by incrementing the counter (block 620). In alternate embodiments, the RW channel may transmit sectors numbers corresponding to the sectors over the DI port rather than using the described sector count technique.

FIG. 6B depicts and a series of sector pulses 636 transmitted through DI port 634 and corresponding incrementation of the counter value 638. Control returns to block 610 and the sequence of sector identification via sector pulse count continues under the seek interval is completed. After the seek interval is completed, the preamplifier accesses the FHC data for the sector corresponding to the counter value and provides the FHC data to a FH controller that adjusts fly-height of the RW heads based on the FHC data (block 622). Control returns to block 602 until the disk drive system is deactivated at block 624.

In the foregoing manner, FHC data is transmitted from the RW channel to the preamplifer before the seek interval is complete. The FHC data is recorded in the preamplifer internal memory in the order of the servo ID (from 0 to max number of servo wedges). After a seek interval is complete, during the RW mode, The RW channel continues transmitting the sector pulses through the differential interface and the index pulses through mode pin to the preamplifer until the RW mode is over. Upon completion of the RW mode, the preamplifer provides the recorded FHC data value to a FH controller that adjusts fly-height based on the counter value 638.

Variations

While the aspects of the disclosure are described with reference to various implementations, these aspects are illustrative and the scope of the claims is not limited thereto. In general, techniques for transferring FHC data as described herein may be implemented with facilities consistent with any hardware system or hardware systems. Plural instances may be provided for components, operations or structures described herein as a single instance. Finally, boundaries between various components, operations and data stores can vary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. The operations may be performed in parallel and/or in a different order. Each block of the flowchart illustrations and/or block diagrams, and combinations of blocks in the flowchart illustrations and/or block diagrams, can be implemented by program code executed by a processor component such as an application specific integrated circuit, a general purpose computer, a special purpose computer, or other programmable machine or apparatus.

Aspects of the disclosure may be embodied as a system, method or program code/instructions stored in one or more machine-readable media. Aspects may take the form of hardware, software (including firmware, resident software, micro-code, etc.), or a combination of software and hardware aspects that may all generally be referred to herein as a "circuit," "module" or "system." The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code.

Use of the phrase "at least one of" preceding a list with the conjunction "and" should not be treated as an exclusive list and should not be construed as a list of categories with one item from each category, unless specifically stated otherwise.

The invention claimed is:

1. A method for controlling fly-height of a read/write (RW) head, the method comprising:
   in response to a servo gate signal, applying an FHC mode signal; and
   in response to the FHC mode signal, transmitting FHC data over a differential interface to a preamplifier disposed in a head-disk assembly;
   wherein the transmitting FHC data over the differential interface comprises, in response to the FHC mode signal, transmitting the FHC data from a RW channel to the preamplifier through a first differential interface port; and
   in response to the FHC mode signal, transmitting a clock signal that is synchronized with the FHC data from the RW channel to the preamplifier through a second differential interface port, wherein the first differential interface port and the second differential interface port each include differential signaling circuitry within the RW channel and the preamplifier.

2. The method of claim 1, wherein the applying an FHC mode signal comprises, in response to the servo gate signal, toggling a mode signal from a read/write (RW) data mode signal to the FHC mode signal.

3. The method of claim 2, wherein the toggling the mode signal comprises toggling, by the RW channel that receives the servo gate signal, the mode signal from the RW data mode signal to the FHC mode signal.

4. The method of claim 1, further comprising:
   decoding the FHC data based, in part, on the clock signal; and
   adjusting the fly-height of the RW head based on the decoded FHC data.

5. The method of claim 1, further comprising, in response to the FHC mode signal, transmitting a start bit signal from the RW channel to the preamplifier through the first differential interface port prior to transmitting the FHC data during an FHC cycle.

6. The method of claim 5, further comprising determining synchronization parameters for the FHC data based on the start bit signal including:
   determining an FHC clock interval by counting pulses of the clock signal within the preamplifier over an interval of the start bit signal; and
   generating an FHC clock signal based on the FHC clock interval.

7. The method of claim 6, further comprising:
   decoding the FHC data based, in part, on the FHC clock signal; and
   adjusting the fly-height of the RW head based on the decoded FHC data.

8. A system for controlling fly-height of a read/write (RW) head, the system comprising:
   a read/write (RW) channel configured to:
      toggle a mode signal from a read/write (RW) data mode signal to a fly-height control (FHC) mode signal in response to a servo gate signal; and
      in response to the FHC mode signal, transmitting FHC data over a differential interface to a preamplifier disposed in a head-disk assembly;
      wherein the RW channel is configured to transmit the FHC data from the RW channel to the preamplifier through a first differential interface port that includes differential signaling circuitry within the RW channel and the preamplifier; and
      wherein the RW channel is configured to transmit a clock signal that is synchronized with the FHC data from the RW channel to the preamplifier through a second differential interface port that includes differential signaling circuitry within the RW channel and the preamplifier;
   a preamplifier decoder configured to decode the FHC data based, in part, on the clock signal; and
   a fly-height controller configured to adjust the fly-height of the RW head based on the decoded FHC data.

9. The system of claim 8, wherein the differential interface comprises differential signaling circuitry for transmitting complementary signal pairs.

10. The system of claim 8, wherein the RW channel is configured to, in response to the FHC mode signal, transmit a start bit signal from the RW channel to the preamplifier through the first differential interface port prior to transmitting the FHC data during an FHC cycle.

11. The system of claim 10, further comprising preamplifier logic configured to determine synchronization parameters for the FHC data based on the start bit signal including:
   determining an FHC clock interval by counting pulses of the clock signal within the preamplifier over an interval of the start bit signal; and
   generating an FHC clock signal based on the FHC clock interval.

12. A method for controlling fly-height of a read/write (RW) head, the method comprising:
   during a seek interval:
      transmitting fly-height control (FHC) data to a preamplifier within a hard disk assembly (HDA), wherein the FHC data includes FHC data for one or more sectors within a target track;
      wherein the transmitting FHC data to the preamplifier comprises, in response to a FHC mode signal, transmitting the FHC data from a RW channel to the preamplifier through a first differential interface port; and in response to the FHC mode signal, transmitting a clock signal that is synchronized with the FHC data from the RW channel to the preamplifier through a second differential interface port, wherein the first differential interface port and the second differential interface port each include differential signaling circuitry within the RW channel and the preamplifier;

recording the FHC data within the preamplifier;

tracking servo sector signals to determine a sector identifier; and following the seek interval, using the sector identifier to access FHC data recorded within the preamplifier that corresponds to the sector identifier.

13. The method of claim 12, wherein the tracking servo sector signals to determine a sector identifier comprises:

initializing a counter in response to a servo sync index signal;

detecting a next servo sector signal; and incrementing the counter in response to the next servo sector signal.

14. The method of claim 13, further comprising transmitting a sector pulse from the RW channel to the preamplifier over a differential interface port in response to detecting the next servo sector signal, and wherein the incrementing the counter comprises incrementing the counter in response to detecting the sector pulse.

* * * * *